United States Patent
Sobanski et al.

(10) Patent No.: US 11,333,037 B2
(45) Date of Patent: May 17, 2022

(54) VANE ARC SEGMENT LOAD PATH

(71) Applicant: United Technologies Corporation, Farmington, CT (US)

(72) Inventors: Jon E. Sobanski, Glastonbury, CT (US); Howard J. Liles, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 50 days.

(21) Appl. No.: 16/783,300

(22) Filed: Feb. 6, 2020

(65) Prior Publication Data
US 2021/0246808 A1    Aug. 12, 2021

(51) Int. Cl.
F01D 9/02    (2006.01)
F01D 25/00   (2006.01)

(52) U.S. Cl.
CPC ............. *F01D 25/005* (2013.01); *F01D 9/02* (2013.01); *F05D 2240/12* (2013.01)

(58) Field of Classification Search
CPC ....... F01D 25/005; F01D 9/02; F05D 2240/12
See application file for complete search history.

(56) References Cited

U.S. PATENT DOCUMENTS

| 5,332,360 | A * | 7/1994 | Correia ................... F01D 9/042 29/889.21 |
| 6,197,424 | B1 * | 3/2001 | Morrison ................ F01D 11/12 428/402 |
| 6,648,597 | B1 | 11/2003 | Widrig et al. |
| 7,510,379 | B2 * | 3/2009 | Marusko ................. F01D 5/282 29/889.7 |
| 8,206,096 | B2 * | 6/2012 | Prentice .................. F01D 5/282 415/191 |
| 8,956,112 | B2 | 2/2015 | Tanahashi et al. |
| 9,308,708 | B2 * | 4/2016 | Kleinow ................. B32B 18/00 |
| 9,708,918 | B2 | 7/2017 | Fremont et al. |
| 9,803,486 | B2 * | 10/2017 | Freeman ............... C04B 37/005 |
| 10,408,084 | B2 | 9/2019 | Thomas et al. |
| 10,934,870 | B2 * | 3/2021 | Whittle .................... F01D 9/041 |
| 2002/0064456 | A1 * | 5/2002 | Marlin .................... B29C 70/34 415/191 |

(Continued)

OTHER PUBLICATIONS

U.S. Appl. No. 16/690,959 titled Vane With Collar filed Nov. 21, 2019.

(Continued)

*Primary Examiner* — J. Todd Newton
*Assistant Examiner* — Theodore C Ribadeneyra
(74) *Attorney, Agent, or Firm* — Carlson, Gaskey & Olds, P.C.

(57) ABSTRACT

A vane arc segment includes an airfoil piece that defines a first platform and an airfoil section that extends from the first platform. The first platform defines a radial flange that extends along at least a portion of a circumferential mate face of the first platform. The airfoil piece is formed of a fiber-reinforced composite that has fibers that are continuous between the airfoil section and the first platform. The airfoil section carries a second platform radially opposite the first platform. The second platform includes a through-hole, and the airfoil section extends through the through-hole.

21 Claims, 5 Drawing Sheets

(56) References Cited

U.S. PATENT DOCUMENTS

| | | | |
|---|---|---|---|
| 2003/0185673 A1* | 10/2003 | Matsumoto | F01D 9/042 |
| | | | 415/159 |
| 2009/0074576 A1 | 3/2009 | Brostmeyer | |
| 2011/0189015 A1 | 8/2011 | Shepherd | |
| 2012/0055609 A1* | 3/2012 | Blanchard | C04B 35/62884 |
| | | | 156/89.11 |
| 2012/0099982 A1* | 4/2012 | Coupe | D03D 25/005 |
| | | | 415/200 |
| 2013/0089429 A1* | 4/2013 | Nunez | D03D 25/005 |
| | | | 416/230 |
| 2015/0040396 A1* | 2/2015 | Fremont | C04B 35/565 |
| | | | 29/889.71 |
| 2016/0221881 A1 | 8/2016 | Delvaux et al. | |
| 2016/0296996 A1* | 10/2016 | Castle | B22C 9/12 |
| 2017/0138208 A1* | 5/2017 | Hillier | F01D 9/041 |
| 2019/0338660 A1* | 11/2019 | Underwood | F01D 25/12 |
| 2019/0368363 A1 | 12/2019 | Walston et al. | |
| 2020/0378267 A1* | 12/2020 | Shinavski | F01D 5/282 |

OTHER PUBLICATIONS

U.S. Appl. No. 16/184,701 titled Continuation of a Shear Tube Through a Vane Platform for Structural Support filed Nov. 8, 2018.

* cited by examiner

VANE ARC SEGMENT LOAD PATH

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramics, such as ceramic matrix composite ("CMC") materials, are also being considered for airfoils. CMCs have high temperature resistance. Despite this attribute, there are unique challenges to implementing CMCs in airfoils.

SUMMARY

A vane arc segment according to an example of the present disclosure includes an airfoil piece that defines a first platform and an airfoil section that extends from the first platform. The first platform defines a radial flange that extends along at least a portion of a circumferential mate face of the first platform. The airfoil piece is formed of a fiber-reinforced composite that has fibers that are continuous between the airfoil section and the first platform. A second platform is carried on the airfoil section radially opposite the first platform. The second platform includes a through-hole, and the airfoil section extends through the through-hole.

In a further embodiment of any of the foregoing embodiments, the fiber-reinforced composite has a braided fiber structure.

In a further embodiment of any of the foregoing embodiments, the second platform is also formed of a fiber-reinforced composite, and the fiber-reinforced composite of the second platform includes stacked fiber plies.

In a further embodiment of any of the foregoing embodiments, the airfoil section excludes any fiber plies of the fiber-reinforced composite of the second platform.

In a further embodiment of any of the foregoing embodiments, the through-hole has a shape that corresponds to the airfoil section.

In a further embodiment of any of the foregoing embodiments, the fibers of the fiber-reinforced composite of the first platform extend in the radial flange.

In a further embodiment of any of the foregoing embodiments, the airfoil section is hollow.

In a further embodiment of any of the foregoing embodiments, there is a non-fibrous interface between the airfoil section and the second platform.

In a further embodiment of any of the foregoing embodiments, the non-fibrous interface is ceramic.

A gas turbine engine according to an example of the present disclosure includes a vane arc segment as in any of the foregoing embodiments.

In a further embodiment of any of the foregoing embodiments, the airfoil piece is formed of a fiber-reinforced composite having fibers that are continuous between the airfoil section and the first platform.

In a further embodiment of any of the foregoing embodiments, the fiber-reinforced composite has a braided fiber structure.

In a further embodiment of any of the foregoing embodiments, the second platform is also formed of a fiber-reinforced composite, and the fiber-reinforced composite of the second platform includes stacked fiber plies.

In a further embodiment of any of the foregoing embodiments, the airfoil section excludes any fiber plies of the fiber-reinforced composite of the second platform.

In a further embodiment of any of the foregoing embodiments, the fibers of the fiber-reinforced composite of the first platform extend in the radial flange.

In a further embodiment of any of the foregoing embodiments, there is a non-fibrous interface between the airfoil section and the second platform.

In a further embodiment of any of the foregoing embodiments, the non-fibrous interface is ceramic.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
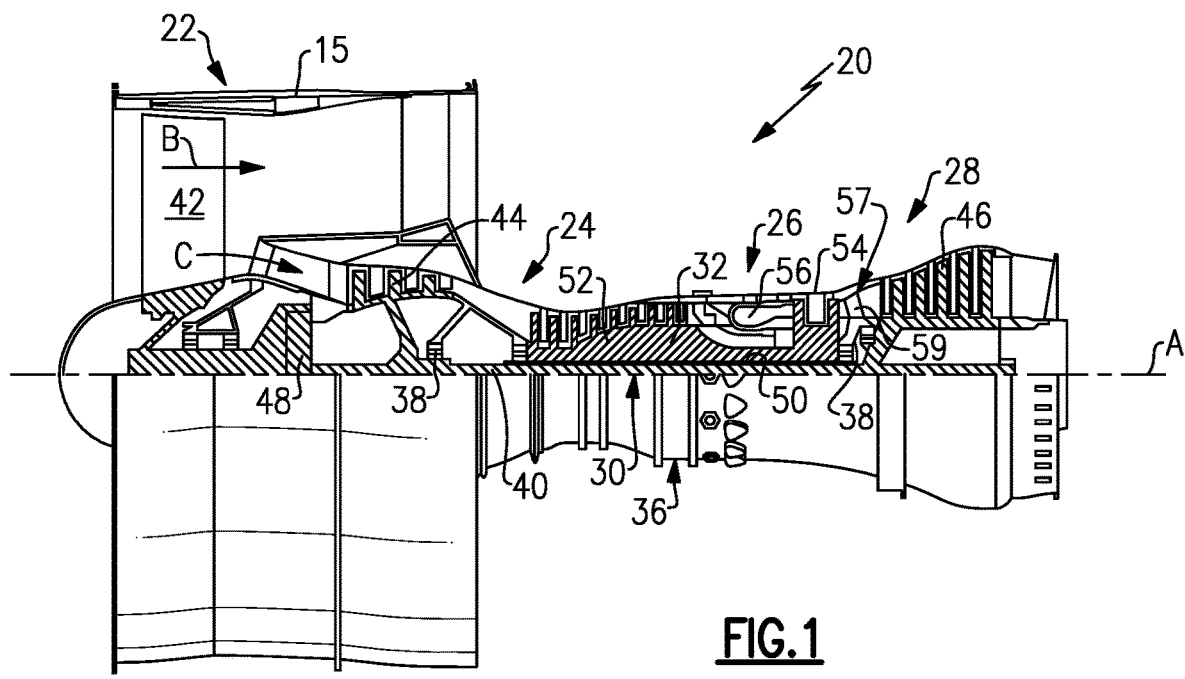
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
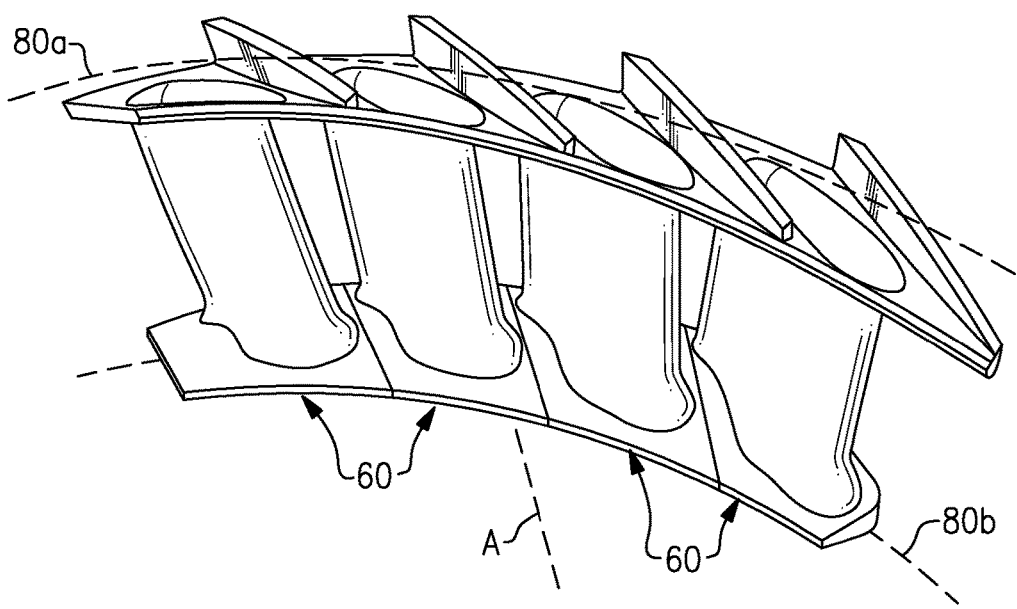
FIG. 2 illustrates a vane ring assembly of the engine.
Figure 3A:
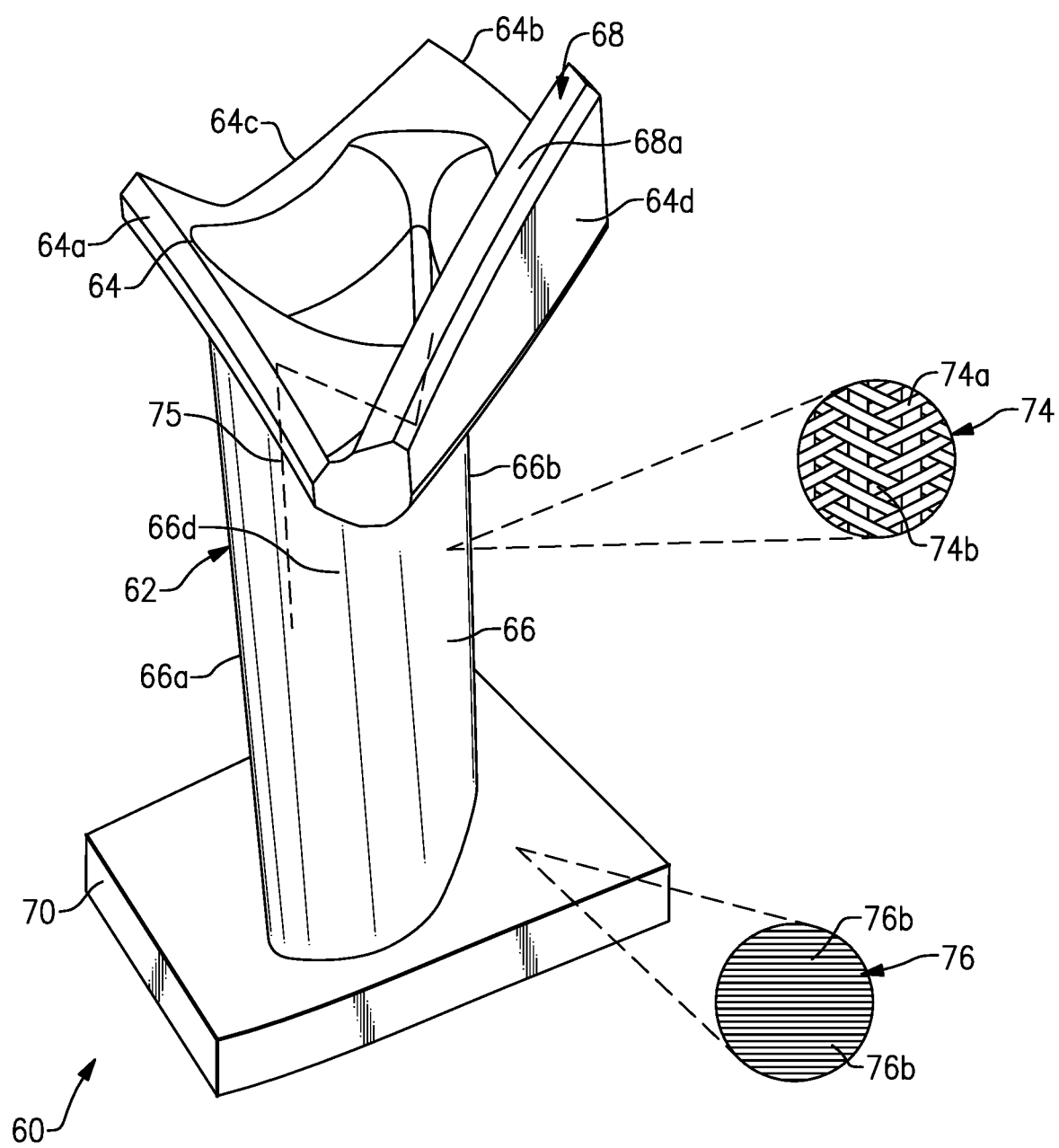
FIG. 3A illustrates an isolated view of a vane arc segment of the vane ring assembly.
Figure 3B:
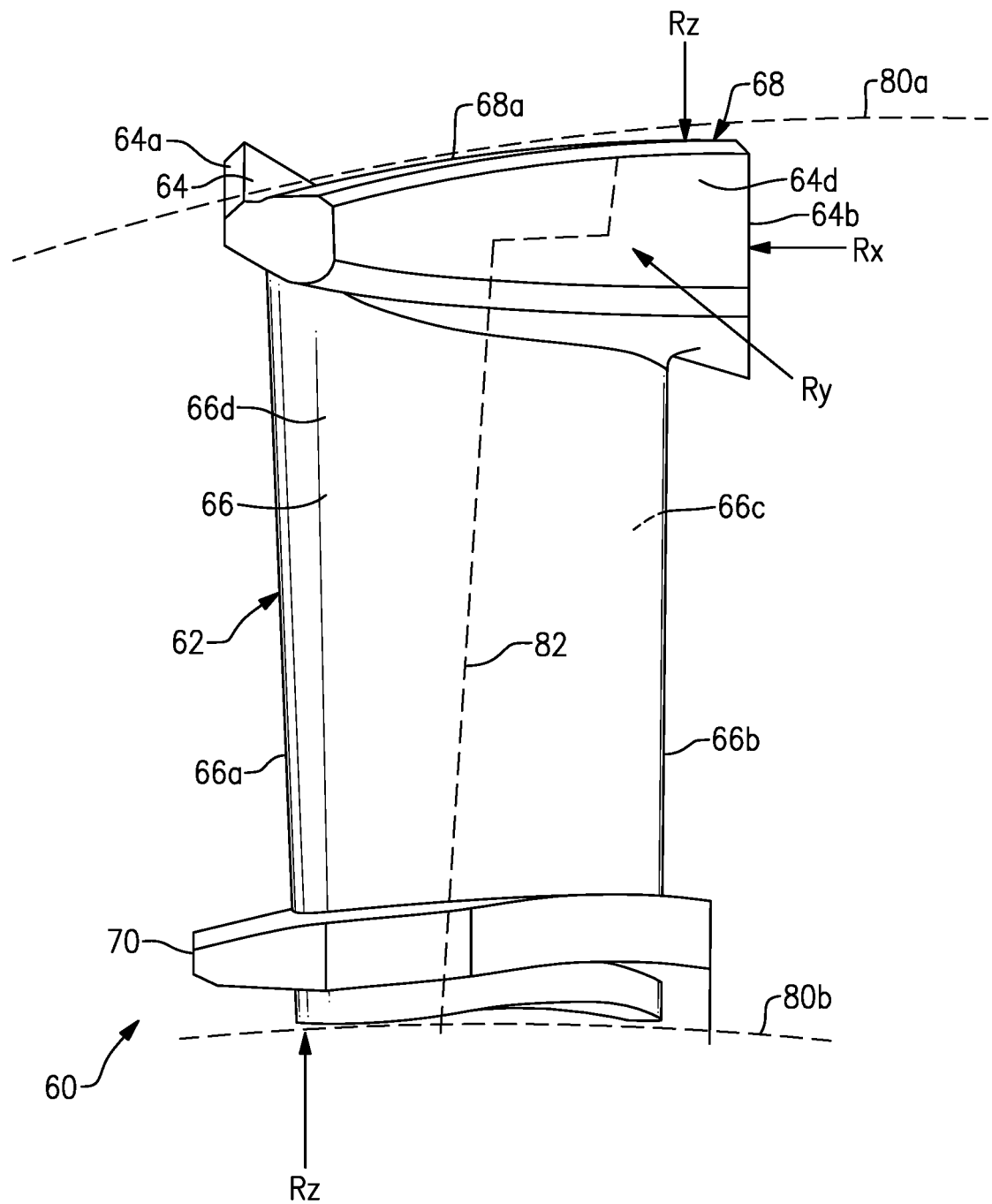
FIG. 3B illustrates another view of the vane arc segment of FIG. 3A.
Figure 3C:
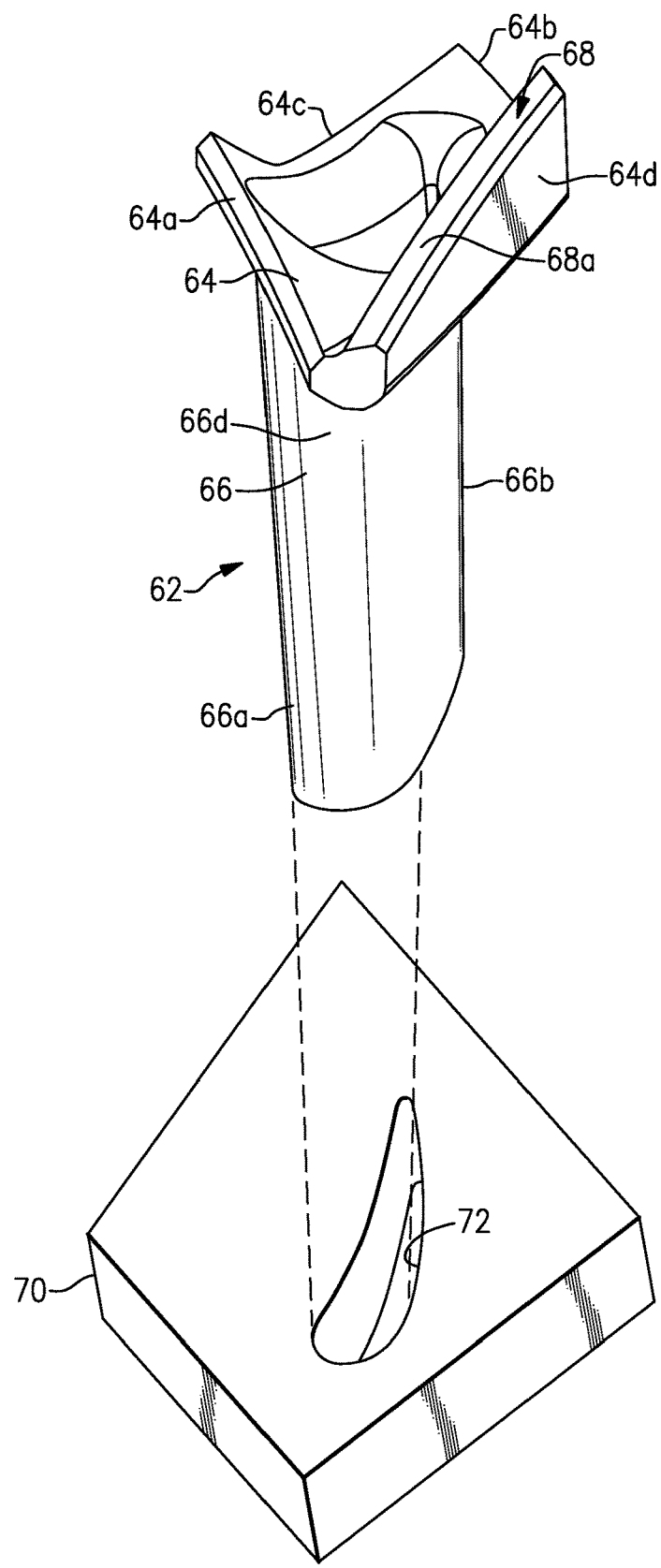
FIG. 3C illustrates an expanded view of the vane arc segment.

FIG. 2 illustrates a representative portion of a vane ring assembly. The vane ring assembly may be from the turbine section 28 of the engine 20 but is not limited thereto or to hot sections of the engine 20. The vane ring assembly is made up of a plurality of vane arc segments 60 that are situated in a circumferential row about the engine central axis A. FIGS. 3A and 3B illustrate isolated views from different angles of a representative one of the vane arc segments 60, and FIG. 3C illustrates an expanded view of the vane arc segment 60. Although the vane arc segments 60 are shown and described with reference to application in the turbine section 28, it is to be understood that the examples herein are also applicable to structural vanes in other sections of the engine 20.

The vane arc segment 60 is comprised of an airfoil piece 62. The airfoil piece 62 defines several sections, including a first platform 64 and an airfoil section 66 that extends radially from the first platform 64. The airfoil section 66 is hollow and defines a leading end 66a, a trailing end 66b, and pressure and suction sides 66c/66d. The first platform 64 includes forward and aft axial faces 64a/64b and circumferential mate faces 64c/64d.

The first platform 64 defines a radial flange 68 that extends along at least a portion of the circumferential mate face 64d. The radial flange 68 is generally elongated and runs along at least a portion of the extent of the circumferential mate face 64d. In the illustrated example, the radial flange 68 is co-extensive with the mate face 64d, although in modified examples the radial flange 68 may be somewhat shorter than the mate face 64d. Most typically, the radial flange 68 runs along at least 50%, at least 60%, or at least 70% of the extent of the mate face 64d.

A radial face 68a of the flange 68 may have planar profile or a curved profile. In the illustrated example, the radial face 68a has a curved profile, which may be used to facilitate load transmission. In the illustrated example, the curved profile is that of a cylindrical surface segment. A cylindrical surface segment is a surface, here the radial face 68a, that has the shape of a section of a surface of a cylinder. For example, the cylindrical surface segment is that of a reference cylinder that has its main axis parallel to the central engine axis A. For instance, the main axis of the reference cylinder is co-linear with the central engine axis A.

A second platform 70 is carried on the airfoil section 66 radially opposite the first platform 64. The second platform 70 includes a through-hole 72 (FIG. 3A). The airfoil section 66 extends through the through-hole 72 (FIG. 3B) and projects beyond the non-gaspath side of the second platform 70. In the illustrated example, the first platform 64 is a radially outer platform, and the second platform 70 is a radially inner platform. It is to be appreciated that modified examples are also contemplated, in which the platforms 64/70 are switched such that the first platform 64 is a radially inner platform and the second platform 70 is a radially outer platform. Additionally, the illustrated example the vane arc segment 60 is a "singlet" in which the airfoil piece 62 has one airfoil section 66. Modified examples are also contemplated in which the vane arc segment is a "multiplet" wherein the airfoil piece 62 has more than one airfoil section 66, such as two or three airfoil sections 66, and the second platform 70 has a corresponding number of through-holes 72.

As shown by inset in FIG. 3A, the airfoil section 66 is formed of a fiber-reinforced composite (FRC) 74. The FRC 74 includes fibers 74a that are disposed in a matrix 74b. The FRC 74 also forms the first platform 64 such that fibers 74a are continuous between the airfoil section 66 and the first platform 64, as generally represented at 75. The fibers 74a are provided in a fiber structure. As shown in this example, the fiber structure is, but is not limited to, a braided structure. The braided or other fiber structure is tubular so as to define the hollow interior of the airfoil section 66 and flares outwards to form the first platform 64.

The FRC 74 is either a ceramic matrix composite (CMC) or an organic matrix composite (OMC). For the CMC, the matrix 74b is ceramic. The ceramic may be, but is not limited to, silicon-containing ceramics. The silicon-containing ceramic may be, but is not limited to, silicon carbide (SiC) or silicon nitride ($Si_3N_4$). An example CMC may be a SiC/SiC CMC in which SiC fibers are disposed within a SiC matrix. For the OMC, the matrix 74b is an organic polymer, such as but not limited to, polyimide and bismaleimide (BMI). An example OMC may be polyimide or BMI matrix with carbon fibers, aramid fibers, ceramic fibers, or glass fibers, as examples.

The second platform 70 is also formed of a FRC 76 and includes fibers 76a that are disposed in a matrix 76b. The fibers 76a are also provided in a fiber structure. The fiber structure of the fibers 76a is different than the fiber structure of the fibers 74a. In the illustrated example, the fiber structure of the fibers 76a is stacked fiber plies (laminate). Each fiber ply may have, but is not limited to, a woven or unidirectional fiber configuration. In general, the airfoil section 66 has a braided tubular fiber structure and the second platform 70 has a laminate ply structure. The FRCs 74/76 may be, but are not limited to, SiC/SiC ceramic matrix composites in which SiC fibers are disposed within a SiC matrix. In that regard, in some examples, the compositions of the fibers 74a/76a are equivalent and the compositions of the matrices 74b/76b are equivalent. The volume percentages of the fibers 74a/76a in their respective FRCs 74/76 may be non-equivalent and selected based on property requirements.

As the airfoil piece 62 and the second platform 70 are distinct pieces, the fibers 74a of the airfoil piece 62 do not extend into the second platform 70, and the fibers 76a of the second platform 70 do not extend into the airfoil section 66. That is, there are no interconnecting fibers between the airfoil section 66 and the second platform 70. Such a configuration facilitates the formation of a tight, consistent braid in the airfoil section 66 since the braid structure is not required to bend/flare outwards to form the second platform 70. The tight, consistent braid structure facilitates enhancing strength and durability.

Figure 4:
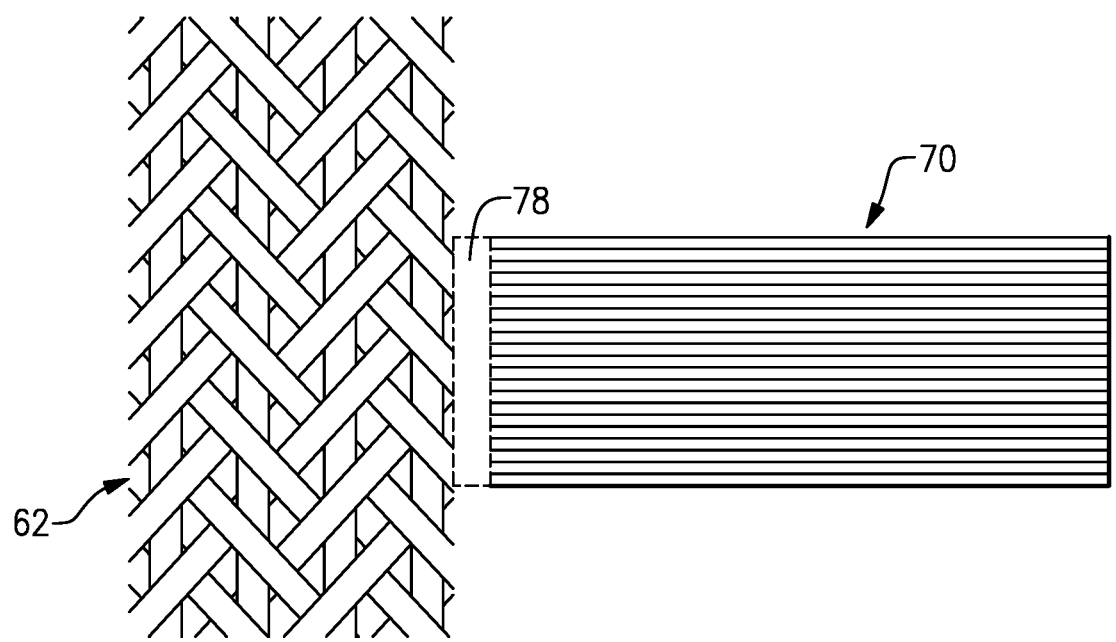
FIG. 4 illustrates an interface between a platform and an airfoil section of the vane arc segment.

The second platform 70 may be bonded to the airfoil section 66, or joined with the airfoil section 66 during co-densification to form the matrices 74b/76b. For instance, as shown in a representative view in FIG. 4, the airfoil section 66 and the second platform 70 have been co-densified such that there is a non-fibrous interface 78 of matrix material between the airfoil section 66 and the second platform 70. As an example, chemical vapor deposition may be utilized to form the matrices 74b/76b. As the matrix material deposits between the fibers 74a/76a, the matrix material also deposits in the interface between the airfoil section 66 and the second platform 70. As there are no fibers in the interface from either the airfoil section 66 or the second platform 70, the matrix material in the interface 78 is non-fibrous. In this regard, the non-fibrous interface 78 is composed of the same composition as the matrices 74b/76b. Alternatively, rather than forming the non-fibrous interface 78 during co-densification, the airfoil section 66 and the second platform 70 are separately fully or partially densified and then the non-fibrous interface 78 is provided in a separate application of a seal or bonding material that joins the airfoil section 66 and the second platform 70. Since the load path through the vane arc segment 60 (discussed below) is not through the second platform 70, the interface 78 need not have structural load-bearing strength as long as the strength is at least sufficient to hold the second platform in place on the airfoil section 66 under the conditions of use in the engine 20.

The vane arc segment 60 is mounted in the engine 20 between inner and outer support structures 80a/80b, which are schematically represented in FIGS. 3A and 3B. The support structures 80a/80b are not particularly limited and may be annular case structures or the like, and may include intermediate hardware between the case and the vane arc segment 60. The support structures 80a/80 are typically formed of, but are not limited to, metallic alloys that can bear the loads received. If in the turbine section 28, combustion gases flow across the airfoil section 66 and gaspath sides of the platforms 64/70. In other sections of the engine 20, the flow may be compressed air or bypass air. The flow causes aerodynamic loads on the vane arc segment 60 that are reacted or transmitted to the support structures 80a/80b.

In general, support schemes for mounting structural vane segments formed of fiber-reinforced composites are challenging due to lower material stress limits. For ceramic matrix composites the stress limits are lower in comparison to high strength superalloys used for some traditional vane segments. For instance, traditional support schemes that utilize hooks or a series of rails can concentrate stresses, create aerodynamic loads, and/or create thermal stresses which may exceed material limits of FRCs, and ceramic matrix composite in particular. Moreover, traditional hooks and rails often have complex geometries that are challenging to manufacture from FRCs. Therefore, even though FRCs may have many potential benefits, such benefits cannot be realized without a suitable support scheme. In this regard, as discussed below, the vane arc segment 60 is designed to facilitate a low-stress mounting scheme.

The aerodynamic loads, represented by aerodynamic forces Rz, Rx, and Ry in FIG. 3B, are reacted to the support structures 80a/80b through a load path 82 through the vane arc segment 60. In this example, the portion of the airfoil section 66 that extends through the second platform 70 (the radially inner end in this example) is mechanically mated to the support structure 80b. Since the fibers 74a/76a do not interconnect the airfoil section 66 and the second platform 70, the second platform 70 is substantially mechanically decoupled from a primary load path 82 through the vane arc segment 60. The load path 82 is through the radial extent of the airfoil section 66, into the first platform 64, and through the radial flange 68 into the support structure 80a. The second platform 70 is off the load path 82 and is thus non-load-bearing and therefore serves primarily as a gaspath fairing. This non-load bearing configuration, in turn, facilitates the ability of the second platform 70 to handle higher thermal gradients and stresses without impacting structural durability. In general, the load path 82 is "corner-to-corner" in the illustrated example, wherein the input load is at the forward pressure side region of the inner end of the airfoil section 66, and the output load is at the aft suction side region of the radial flange 68.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:
   an airfoil piece defining a first platform and an airfoil section extending from the first platform, the first platform defining a radial flange extending along at least a portion of a circumferential mate face of the first platform, and a circumferential face of the radial flange being flush with the circumferential mate face of the first platform, the airfoil piece being formed of a fiber-reinforced composite having fibers that are continuous between the airfoil section and the first platform; and
   a second platform carried on the airfoil section radially opposite the first platform, the second platform including a through-hole, the airfoil section extending through the through-hole.

2. The vane arc segment as recited in claim 1, wherein the fiber-reinforced composite has a braided fiber structure.

3. The vane arc segment as recited in claim 1, wherein the second platform is also formed of a fiber-reinforced composite, and the fiber-reinforced composite of the second platform includes stacked fiber plies.

4. The vane arc segment as recited in claim 3, wherein the airfoil section excludes any fiber plies of the fiber-reinforced composite of the second platform.

5. The vane arc segment as recited in claim 1, wherein the through-hole has a shape that corresponds to the airfoil section.

6. The vane arc segment as recited in claim 1, wherein the fibers of the fiber-reinforced composite of the first platform extend in the radial flange.

7. The vane arc segment as recited in claim 1, wherein the airfoil section is hollow.

8. The vane arc segment as recited in claim 1, wherein there is a non-fibrous interface between the airfoil section and the second platform.

9. The vane arc segment as recited in claim 8, wherein the non-fibrous interface is ceramic.

10. The vane arc segment as recited in claim 1, wherein the flange runs along a length of at least 50% of the circumferential mate face between forward and axial face of the first platform.

11. A gas turbine engine comprising:
    first and second support structures;
    vane arc segments supported between the first and second support structures, each said vane arc segment including
       an airfoil piece defining a first platform and an airfoil section extending from the first platform, the first platform defining a radial flange extending along at least a portion of a circumferential mate face of the first platform, and a circumferential face of the flange is flush with the circumferential mate face of the first platform, and
       a second platform carried on the airfoil section radially opposite the first platform, the second platform including a through-hole, the airfoil section extending through the through-hole, and
       a load path from the first support structure extending through the airfoil section, the first platform, and the radial flange to the second support structure, the second platform being non-load bearing with regard to the load path.

12. The engine as recited in claim 11, wherein the airfoil piece is formed of a fiber-reinforced composite having fibers that are continuous between the airfoil section and the first platform.

13. The engine as recited in claim 12, wherein the fiber-reinforced composite has a braided fiber structure.

14. The engine as recited in claim 12, wherein the second platform is also formed of a fiber-reinforced composite, and the fiber-reinforced composite of the second platform includes stacked fiber plies.

15. The engine as recited in claim 14, wherein the airfoil section excludes any fiber plies of the fiber-reinforced composite of the second platform.

16. The engine as recited in claim 12, wherein the fibers of the fiber-reinforced composite of the first platform extend in the radial flange.

17. The engine as recited in claim 11, wherein there is a non-fibrous interface between the airfoil section and the second platform.

18. The engine as recited in claim 17, wherein the non-fibrous interface is ceramic.

19. The vane arc segment as recited in claim 1, wherein the fibers of the fiber-reinforced composite extend in the airfoil section, then turn from the airfoil section into the first platform, and then turn from the first platform into the radial flange.

20. The vane arc segment as recited in claim 1, wherein the radial flange has a radial face that has a curved profile.

21. The vane arc segment as recited in claim 20, wherein the curved profile is a cylindrical surface segment.

* * * * *